Sept. 25, 1962   M. STRASSBERG   3,055,230
SCREW-NUT ASSEMBLIES
Filed June 7, 1961   2 Sheets-Sheet 1
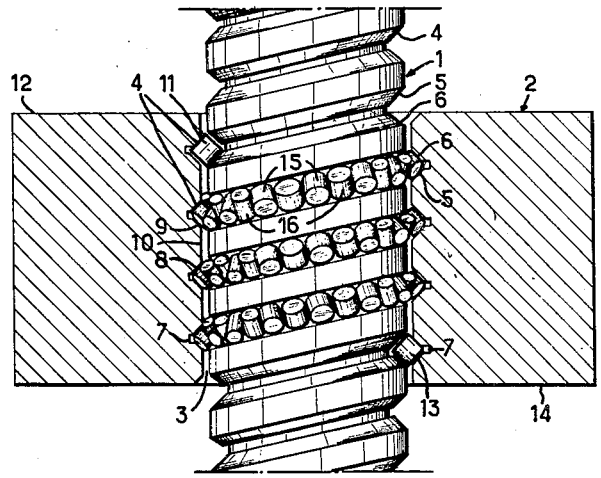
FIG:1
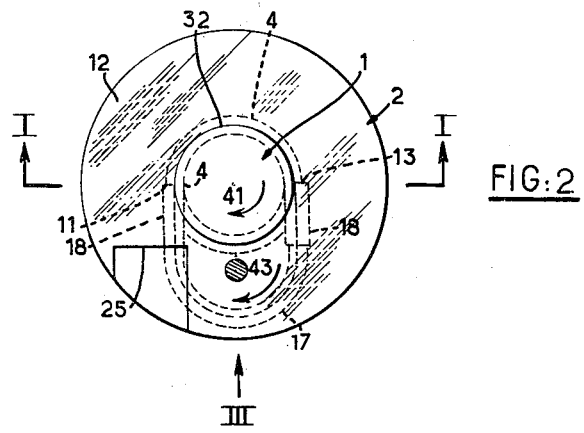
FIG:2
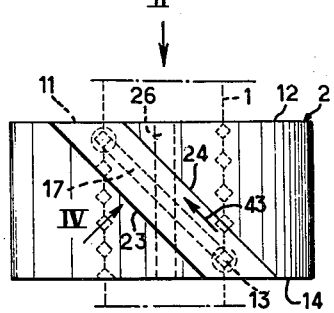
FIG:3
INVENTOR
MAXIMILIEN STRASSBERG Sept. 25, 1962 M. STRASSBERG 3,055,230
SCREW-NUT ASSEMBLIES
Filed June 7, 1961 2 Sheets-Sheet 2
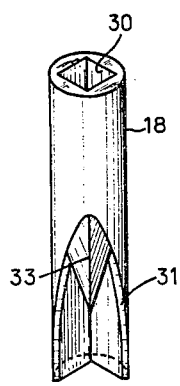
FIG: 8
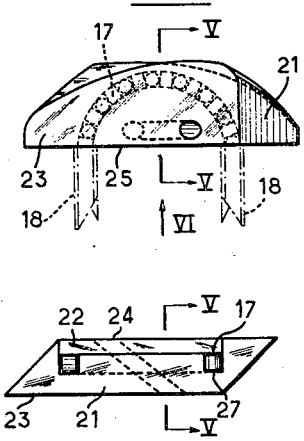
FIG: 4
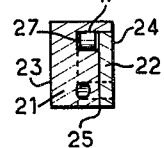
FIG: 5
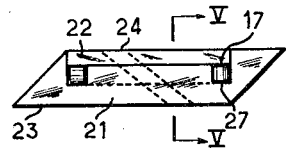
FIG: 6
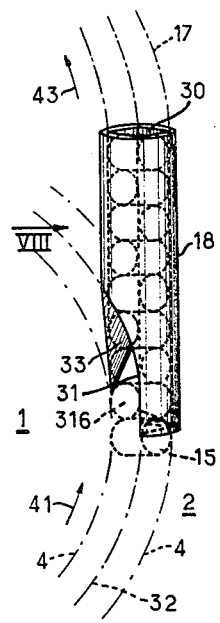
FIG: 7
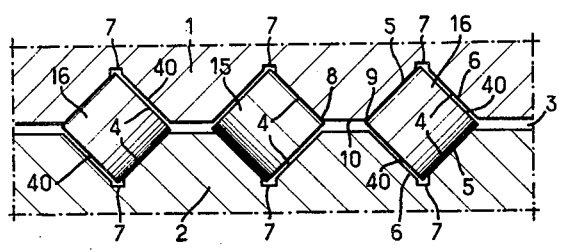
FIG: 9
FIG: 10
INVENTOR
MAXIMILIEN STRASSBERG
ATTY.

United States Patent Office 3,055,230
Patented Sept. 25, 1962

3,055,230
SCREW-NUT ASSEMBLIES
Maximilien Strassberg, 31 Ave. du President Wilson,
Joinville, France
Filed June 7, 1961, Ser. No. 115,540
Claims priority, application France Feb. 28, 1961
3 Claims. (Cl. 74—424.8)

This invention relates to screw-nut assemblies, which comprise a screw threaded through a nut in a manner such that relative rotation between the screw and nut effects axial movement of one or the other thereof, and of an element which may be attached to the axially movable part. Such screw-nut assemblies are currently met with, in particular, in machine tools where they form part of the tool carrier moving mechanism, in closing and opening of valves and hydraulic sluices, in the steering mechanism of cars, and more generally in numerous devices for producing a motion of translation of a heavy object from a movement of rotation.

In assemblies of this type, friction between screw and nut must be reduced to a minimum. With this object in view, it has already been proposed to insert between the screw and the nut a row of ball bearings which run both in the screw threads and in the threads of the nut. These threads have a section in the shape of a circular arc so that there is formed between the opposed threads of the screw and nut a helical tube of circular section, reaching from one end of the nut to the other, a channel for returning the ball bearings from one end of said helical tube to the other being formed in the body of the nut.

In screw-nut assemblies of this type considerable improvement has been achieved. They are not however without their drawbacks, and as will be understood, the area of contact between one ball bearing and each thread which surrounds it is in fact limited to a point surface. Consequently the stress exerted between nut and screw is in practice spread over a certain number of point surfaces the total area of which is very small. It follows that these screw-nut assemblies wear out very quickly and are incapable of standing up to heavy stress. It will also be seen that where such assemblies work at high speed, the ball bearings may be subjected to vibration frequencies equal to their own frequency of natural vibration, which may result in serious deterioration.

The object of the invention is to produce a screw-nut assembly which is resistant to wear and capable of withstanding considerable loads, and able to work at high speed without the risk of resonance vibration being set up.

According to the invention there is provided a screw-nut assembly in which the screw is threaded through the nut in a manner such that relative rotation between the screw and nut effects axial movement of one or the other thereof and of an element which may be attached to the axially movable part, wherein each roller of a series thereof of rollers disposed between the screw and nut is rotatable simultaneously with the rotatable part, and the configuration of the threads of the screw and nut is shaped to conform to the peripheral contour of the rollers.

The rollers are preferably cylindrical in section, and the threads are shaped as a right angle triangle or approximating thereto.

In a preferred embodiment of the screw assembly in accordance with the invention, the threads of the screw and of the nut display a section shaped as a right isosceles triangle, the right angle being situated at the bottom of the thread, in such a way that the opposing threads of the screw and nut form between them a helical tube of square section extending from the vicinity of one end of the nut up to the vicinity of the other end of the nut, and this helical tube contains a series or rollers which comprise rollers whose axes are disposed perpendicularly to one of the faces of a thread of the screw or of the nut, alternating with rollers whose axes are disposed perpendicularly to the other face of the same thread, the diameter of all these rollers being equal to a side of the square section of the helical tube, and their axial height being slightly less than a side of the said square section, whilst a recovery channel for return of the rollers is formed in the body of the nut and forms a connection between the two ends of the helical tube, the channel having a square section corresponding to that of the helical tube and being joined tangentially to the ends of the helical tube.

In such a screw-nut assembly each roller is supported on the screw and on the nut along two diametrically opposed generator lines which are respectively in contact with two opposing faces of the helical square section tube formed between the threads of the screw and of the nut. Each roller has also a slight axial play in the helical tube, so that it may rotate freely in the helical tube when relative rotation of the screw-nut occurs.

As will be understood, the stress exerted between nut and screw is not carried by a number of point surfaces as in the case of those screw-nut assemblies having ball bearings, but by a plurality of linear surfaces the total area of which is relatively greater. This enables the screw nut assembly of the invention to withstand considerable loads without deterioration. It therefore follows that its working life is much increased under normal usage.

It will also be appreciated that owing to the arrangement of the rollers whose axes cross alternately, the axial play of the nut in relation to the screw is exceedingly low since the rollers rolling upon one face of a screw thread prevent the axial shifting of the nut in one direction whilst the rollers rolling upon the other face of the screw thread prevent the axial movement of the nut in the other direction.

Furthermore it will be seen that such a screw-nut assembly may operate at high speeds without risk of resonant vibration occurring, since owing to the cylindrical shape of the rollers it is practically impossible for them to enter into such a state of vibration in the course of operation.

In order that the invention may be clearly understood, one embodiment thereof will now be described by way of example with reference to the accompanying drawings, in which:

FIG. 1 shows in part-section a screw-nut assembly according to the invention, with the nut shown in axial section along the line I—I of FIG. 2, and illustrating the disposition of the rollers between the screw and nut threads.

FIG. 2 shows on a smaller scale a plan view of the screw-nut assembly of FIG. 1 viewed along the arrow II of FIG. 3.

FIG. 3 is a side view of the assembly viewed along the arrow III of FIG. 2.

FIG. 4 is a view taken along the arrow IV of FIG. 3 showing the part of the nut in which the recovery channel is fitted for recovering the roller bearings.

FIG. 5 shows that part of the nut in transverse section along lines V—V of FIGURES 4 and 6.

FIG. 6 shows this assembly viewed in the direction of arrow VI of FIG. 4.

FIG. 7 gives a perspective view of a junction which joins the recovery channel tangentially to the ends of the helical tube formed between the threads of the screw and of the nut.

FIG. 8 shows a perspective view of this same junction seen in the direction of arrow VIII of FIG. 7.

FIG. 9 shows a large scale section of three successive threads of the screw and of the nut.

FIG. 10 is a developed view of a thread containing a series of rollers.

Considering the embodiment selected and illustrated in these drawings, an assembly according to the invention comprises a screw 1 threaded into a nut 2 with a slight radial play 3 of the nut in relation to the screw. Threads 4 of the screw and of the nut (FIGURES 9 and 10) have a section in the shape of a right angle triangle, sides 5 and 6 being equal, the right angle of this triangle being situated at the bottom of the thread. This thread bottom is cut away to form a small channel 7. The pitch of the thread, for the screw and for the nut 2, is sufficiently large to ensure that the neighbouring edges 8 and 9 of the two successive turns (FIG. 9) are separated axially by a spacing 10 which is about equal to half the total width of a thread.

The opposing threads of screw 1 and nut 2 between them form a helical tube of square section which extends from a point 11 located in the vicinity of an end 12 of the nut and ends at a point 13 located in the vicinity of the other end 14 of this nut (FIGURES 1 to 3).

This helical tube contains a series of rollers of ball bearing steel comprising rollers 15, the axes of which are arranged perpendicularly to one of the faces 5 of a thread 4 of the screw or of the nut, alternated with rollers 16 the axes of which are arranged perpendicularly to the other face 6 of the same thread (FIGS. 1 to 10). All these rollers 15 and 16 have the same dimensions; their diameter is equal to the side of the square section of the helical tube and their axial height slightly less than the side of this square section, for example 1/10 of a millimetre less.

A recovery channel 17 for return of the rollers is formed within the body of the nut and connects the ends 11 and 13 of the helical tube. This channel 17 follows a rounded path. Its section is square and corresponds to that of the helical tube of the rollers. It joins up tangentially to the ends 11 and 13 of the helical tube through the medium of two tubular junctions 18 which are sunk into the nut body 2.

As will be seen from FIGURES 3 to 6, the channel 17 is formed by a free space between two assembly units 21 and 22 which together constitute an assembly having the form of that portion of the nut 2 described by two parallel planes 23 and 24 at an angle of 45 degrees in relation to the axis of the nut and forming the lateral faces of the said assembly (FIG. 3), as well as by a surface 25 (FIG. 2) parallel to the axis of the nut and forming the internal face of this assembly. The assembly of units 21 and 22 fits exactly into a corresponding cavity in the body of the nut 2. An axial pin 26 ensures the correct location of the units 21 and 22 both to each other and to the remainder of the nut 2. As will be seen from FIGURES 5 and 6, the unit 21 has a groove 27 which creates within the unit a semi-circular shaped channel of square section and thus forms a ramp for the movement of the rollers, whilst the unit 22 formed by a semi-circular plate forms a cover which closes the outlet of the groove 27 and thus completes the formation of the channel 17.

Junctions 18 embedded in the body of the nut are located to form an extension of the channel 17 (FIG. 2), being accommodated in cylindrical bores made perpendicularly in the bottom of the cavity housing the assembly of the units 21—22. The ends of the junctions 18 are located opposite the ends 11 and 13 of the helical tube formed between the threads of the screw and of the nut. The junctions 18 comprise an inner bore 30 of square section (FIGURES 7 and 8), and their lateral wall has an indent 31 the rims of which are located on a cylinder 32 (FIG. 7) forming the internal bore of the nut 2; this indent is for the purpose of permitting the free passage of screw 1. In the top of the indent 31 there extends a continuation 33 of the junction 18. This continuation 33 is cut in the form of a point directed axially; and its edges are thin. Its straight section is profiled on the outside as a right angle, so that it penetrates into the bottom of thread 4 of the screw. This extension 33 forms a deflector for the rollers 15 and 16, forcing them to divert into the internal bore 30 of junctions 18.

As will be understood from the previous description, rollers 15 and 16 may rotate freely in the helical tube formed by the opposing threads 4 of the screw and the nut, when relative rotation takes place between the nut 2 and the screw 1. These rollers bear in effect along two generator lines diametrically opposed on two opposite faces of the helical tube, whilst slight play 40 (FIG. 9) exists between their transversal faces and the two other opposing faces of the helical tube. The disengagement which occurs due to the channel 7 simplifies this movement. Rollers 15 and 16 thus travel through the helical tube from one to the other of the extremities 11 and 13 of this tube. Supposing for instance that the screw rotates in relation to the nut according to arrow 41 of FIGURES 2 and 7, rollers 15 and 16 move in the helical tube as per the arrow 42 of FIGURE 1. Having reached the extremity 13 of this tube they are thrust by the following rollers, and guided by the deflector 33 of the corresponding junction 18, they continue onwards in the bore 30 of this junction to the channel 17 for recovering the roller bearings (arrow 43 of FIGURES 2, 3 and 7). They travel the whole of this channel 17 and then return to the extremity 11 of the helical tube, after having traversed the corresponding junction 18. If the screw 1 continues to rotate in the same direction, the same rollers 15 and 16 then undertake a second travel of the helical tube in the direction stated above. If the direction of rotation of the screw 1 is reversed, the direction of movement of rollers 15 and 16 is also immediately reversed.

Such a screw-nut assembly has a much better performance than the earlier screw-nut assemblies, due to the more satisfactory action of the rollers 15 and 16 in the threads 4. Resistance to motion is practically eliminated.

The relatively large surface of contact of each roller with the screw and nut makes this assembly able to withstand considerable loads without appreciable deterioration, and given normal usage it is capable of functioning for a very long time.

The axial play of screw 1 in relation to nut 2 may be almost completely eliminated due to the roller being arranged alternately.

This assembly can work at high speed without risk of internal vibration occurring.

The invention is not limited to the embodiment described and illustrated, but can on the other hand be made the subject of various modifications within the scope of the invention. In particular the cover 22 may conceivably be dispensed with, in which case the space adjacent to the nut 2 would act as a cover thereby saving the space which would otherwise be taken up by that cover.

It will be understood that the invention is thus directed to various applications of the screw-nut assembly with rollers as described above, especially the application of such screw-nut assembly to devices for moving tool holders on machine tools, to closing and opening mechanism for valves and hydraulic sluices, and to the steering mechanism of cars.

What I claim is:

1. A screw-nut assembly comprising a screw having a helical thread in the outer cylindrical surface thereof, a nut having a cylindrical bore which receives said screw and which has in its surface a helical thread extending from the vicinity of one end of the nut to the vicinity of the other end of the nut, said threads of the screw and the nut having the same pitch and having a section substantially shaped as a right isosceles triangle the right angle of which is located at the bottom of the thread so that the opposing threads of the screw and of the nut define between them a helical tube of substantially square section extending from the vicinity of one end of the nut to the vicinity of the other end of the nut, the said helical tube containing a series of cylindrical rollers comprising rollers whose axes are disposed perpendicular to one of the faces of a thread of the screw or of the nut, alternating with rollers whose axes are disposed perpendicular to the other face of the same thread, the diameter of all these rollers being equal to a side of the square section of the helical tube and their axial height being slightly less than a side of the said square section, and a recovery channel for the return of said rollers formed in the body of the nut, said recovery channel forming a connection between the two ends of the helical tube, said recovery channel having a square section corresponding to that of the helical tube.

2. A screw-nut assembly according to claim 1 wherein the recovery channel is formed by a free space between two assembly units which together constitute an assembly having the form of a portion of the nut described by two parallel planes inclined in relation to the axis of the nut and also by a plane parallel to the said axis, the assembly of these two units fitting exactly into a further cavity in the nut.

3. A screw-nut assembly according to claim 2 wherein the said two assembly units are fitted to the nut by a pin which passes through both said assembly units in a direction parallel to the axis of the nut.

References Cited in the file of this patent

UNITED STATES PATENTS

| | | |
|---|---|---|
| 2,508,281 | Miller et al. | May 16, 1950 |
| 2,855,792 | Gates | Oct. 14, 1958 |
| 2,925,744 | Folkerts | Feb. 23, 1960 |
| 2,938,400 | Gondek | May 31, 1960 |

FOREIGN PATENTS

| | | |
|---|---|---|
| 12,220 | Great Britain | July 6, 1900 |